United States Patent Office 2,831,840
Patented Apr. 22, 1958

2,831,840

PROCESS FOR TREATING POLYMER COAGULATES

Johannes Lindeboom, Rhoon, Netherlands, assignor to Shell Development Company, New York, N. Y., a corporation of Delaware No Drawing. Application June 28, 1954
Serial No. 439,879

Claims priority, application Netherlands July 3, 1953

2 Claims. (Cl. 260—87.7)

This invention relates to the treatment of polymer coagulates. More particularly, the invention relates to a new process for treating polymer coagulates, such as obtained by aqueous emulsion polymerization and subsequent coagulation, to form dry, finely-divided polymer particles which may be easily processed to form improved plastic articles.

Specifically, the invention provides a new and highly efficient process for treating wet coagulates of non-rubbery thermoplastic polymers, such as may be obtained by aqueous emulsion polymerization of the monomers and subsequent coagulation, to form dry, finely-divided polymer particles which can be easily combined with plasticizers and other additives and give superior plastic articles, which comprises pressing the particles of the wet coagulate together in an enclosed zone so as to sinter the polymer particles together into coherent masses having high bulk density and containing little if any water, while withdrawing the expelled liquid, and then grinding the resulting product.

Coagulates obtained by polymerizing ethylenically unsaturated compounds in an aqueous emulsion contain considerable quantities of water and emulsifying agent. These polymers are used in the plastic field chiefly in the dry form so some means must be employed to convert the wet coagulates into a dry powder. The method used heretofore to effect this conversion comprises evaporation of the water either by direct application of heat or by passing hot currents of gas over the wet coagulate. These methods, however, have not proved entirely satisfactory. In the first place, the polymer particles obtained by these drying methods have had such a structure that it has been very difficult to effect a mixture of the particles with plasticizers to form a homogeneous composition. This incomplete mixing is evidenced by the large number of "fish-eyes" (i. e. unplasticized pellets) in the finished sheet. In some cases, this incomplete mixing and occurrence of "fish-eyes" can be avoided by using longer periods of mixing and higher temperatures, but these corrective features are undesirable as they affect other desired properties of the plasticized sheets. In addition, the prior known methods of drying are unable to remove the emulsifying agent and other relatively non-volatile additives and the presence of these materials has a detrimental effect on the thermostability and electrical properties of the finished product. Furthermore, these prior known methods of drying the coagulates have been expensive to operate and require use of a relatively large outlay of equipment.

It is therefore an object of the invention to provide a new method for treating polymer coagulates. It is a further object to provide a new method for treating wet polymer coagulates to form dry, finely-divided polymer particles having high bulk density. It is a further object to provide a new method for treating wet coagulates to form dry, finely-divided polymer particles which are more adapted for use in preparing plastic articles. It is a further object to provide a method for treating wet polymer coagulates to form dry powdered polymer particles which can be easily combined with plasticizers and other additives to form homogeneous products. It is a further object to provide a method for treating wet polymer coagulates that may effect a rapid and efficient removal of emulsifier and other additives employed in the polymerization. It is a further object to provide a method for treating wet polymer coagulates that may be operated in a relatively inexpensive manner. Other objects and advantages of the invention will be apparent from the following detailed description thereof.

It has now been discovered that these and other objects may be accomplished by the process of the invention which comprises pressing the particles of the wet polymer coagulate together in an enclosed zone, so as to sinter the polymer particles together into coherent masses having high bulk density and containing little if any water, while withdrawing the expelled liquid, and then grinding the resulting product. It has been found that by the use of this method one can convert the wet coagulates into finely-divided particles which are substantially free of water, e. g., contain less than about 2% water, and possess a much higher bulk density. These dry particles have been found to be unexpectedly superior in the formation of plasticized articles as they can be easily combined with the plasticizer at the normal operation conditions to give homogeneous compositions and such compositions can be molded or calendered to form plastic products free of fish-eyes. In addition, the finished products have superior thermostability and electrical properties as they are substantially free of emulsifying agents and other additives employed during the polymerization.

According to the process of the invention, the wet coagulates of the polymers are first pressed in an enclosed zone. The expression "enclosed zone" as used herein refers to a zone having means for holding the particles in a restricted space. There should, of course, be openings in the zone in order to permit withdrawal of the expelled liquid as indicated hereinafter. The pressing of the wet coagulates may be accomplished by any suitable apparatus which permits application of the necessary pressure to the wet particles and removal of the expelled liquid. Particularly preferred presses of this type comprise the continuously operating screw-presses known in the vegetable oil industry as oil-expellers. The usual continuously operating screw-press comprises an apparatus wherein the material to be pressed is forced through a channel by the operation of a screw, the material gradually obtaining less space in the direction of the movement and the material being subjected to gradually increasing pressure in the direction of the movement. The screws moves in a housing of which the internal wall is a plane of rotation co-axial with the screw. The reduction of the space for the material in the direction of the movement is accomplished by a reduction in both the diameter of the screw and the internal diameter of the housing, by a reduction in the distance between the walls of the screw and the housing, and/or by a reduction of the space between successive turns of the screw-thread. Small holes or grooves are provided in the wall of the housing for draining off the liquid pressed out. There may also be small holes or grooves for this purpose in the screw. The screw-thread need not form a connected whole, but in certain forms of apparatus may be interrupted. The screw and internal wall of the housing are often conical, so that the movement of the material occurs in the direction of the vortex of the cone. In other cases only the end of the screw and the internal wall of the housing are conical. This conical shape facilitates adjustment to the required discharge pressure. Thus, the discharge pressure can be varied by adjusting the screw in relation to the housing in the direction of the axis. The discharge pressure also depends on the velocity at which the screw is driven.

According to the process of the invention, the wet coagulates are pressed so as to sinter the polymer particles togethre, i. e. compressed together with some softening, but without complete coalescence, into coherent masses.

During this operation, the water is removed from the particles so that they contain only a few percent, e. g. less than about 5 to 10%, water and the pores in which the water was contained are pressed tight to form particles having greater bulk density. In the case of the vinyl chloride polymers, the bulk densities of the finished particles are preferably greater than about 0.40 g./cu. cm. This change in form is permanent and is not lost in later processing.

The above-noted sintering of the particles together is accomplished by regulating the pressure, temperature and duration of pressing. Increase in temperature, increase in pressure and extension of the duration of pressing have all three a favorable effect in producing the required result. If a certain high pressure cannot be obtained, in many cases the required effect may be obtained by further increasing the temperature and/or extending the duration of pressing. If a certain high temperature has to be avoided, the required effect may often be obtained by a further increase in pressure and/or extending the duration of pressing. With a continuously operating screw-press, however, the temperature depends on the pressure. As the pressure becomes higher the temperature of the material treated increases further as a result of increased friction. To reach the required temperature in the press, the coagulates, before being placed in the press, may be pre-heated to a certain temperature. Often there is no need for pre-heating and in certain cases it is necessary to cool before or during the pressing. In certain cases, it may be desirable to cool the coagulates before placing them in the press.

The required discharge pressure is generally between 150 and 600 atmospheres absolute and sometimes still higher, such as up to 800 atmospheres absolute. Suitable feed temperatures range from about 20° C. to 100° C. When treating coagulates of polyvinyl chloride in a continuously operating screw-press a suitable feed-temperature generally lies between 30° C. and 80° C. preferably between 30 and 60° C.

As indicated above, the water expelled during the pressing is removed from the enclosed zone. This is accomplished by providing suitable openings in the zone for the passage of the liquid. Under the conditions of the process, the polymer particles are retained in the zone and do not come out through these openings with the expelled liquid. In the case of the continuously operating screw-press as described hereinbefore, small holes or grooves are provided in the wall of the housing for draining off the liquid pressed out. The openings at the top of the housing preferably vary from about 0.8 to 1 mm. while those at the bottom vary from about 0.1 to 0.3 mm.

The coherent particles obtained by the pressing and removal of liquid are then ground into a finely divided powder. The grinding may be accomplished in any suitable apparatus, but is preferably accomplished in an apparatus wherein disintegration is accomplished by means of pounding. Particularly preferred are the disintegrators wherein the particles in suspension are pounded by rotating bars, rods, hammers or blades. Grinding equipment without screen is to be preferred.

The final product usually desired is a powder in which hardly any particles occur larger than 0.5 mm. It is preferred to keep the size of the particles to an upper limit of 0.1 mm. Grinding may be continued until there are practically no particles larger than 0.5 mm. and more preferably particles not larger than 0.1 mm. It is, however, of advantage not to continue the grinding process until all the particles above the limiting values mentioned have disappeared but to separate the larger particles from the ground product which still contains them. After this separation, the coarse fractions are refed into the grinding equipment, while the finer fractions form the final product. Although any known method of separating may be used, separation by means of air current is preferred.

Although the final products of the present process are always of excellent quality provided the particle size is less than 0.1 mm., final products of a relatively homogeneous particle size are preferred, e. g. a product with a predominating particle size of 0.05 to 0.1 mm., or a product of which the particle size lies mainly between 0.02 and 0.05.

The finely-divided dry polymer particles obtained by the above-described process are superior to those obtained by any of the prior known processes in that they have a much higher bulk density and can be easily combined with plasticizers by conventional methods of mixing to form homogeneous mixtures. Examples of such plasticizers include, among others, dioctyl phthalate, dinonyl phthalate, dibutyl phthalate, tricresyl phosphate, tri-(2-ethylhexyl) - 1,2,4 - butanetricarboxylate, ethylene glycol dicaprate, 1,5-pentanediol dicaprylate, dibutyl sebacate, di-n-decyl adipate, methoxyethyl oleate, polyethylene-di-2-ethyl hexoate, polyester resin known as paraplex G–60, and the like. The resulting homogeneous compositions can then be milled or molded to form superior plastic products free of "fish-eyes." The polymer particles produced by the above process are also superior to those obtained by the known processes in that they are relatively free of emulsifying agents and other additives and can be converted into plastic articles having excellent thermostability and electrical properties.

The wet polymer coagulates used in the process of the invention comprise the coagulates of polymers of ethylenically unsaturated compounds which polymers are relatively non-rubbery and have a tendency to adhere together when wet. The expression "non-rubbery" as used herein refers to those polymers which break at an elongation of less than 100%. Included within this group are the polymers of the monomers containing at least one $=C=C=$ group, such as vinyl chloride, styrene, methyl methacrylate, vinylidene chloride, acrylonitrile, methacrylonitrile, vinyl acetate, vinyl benzoate, divinyl succinate, diallyl phthalate, vinyl allyl phthalate, vinyl pyridine, diallyl carbonate, allyl acetate, and the like.

Particularly preferred are the solid thermoplastic polymers of monomers containing a single $CH_2=C=$ group, and more particularly polymers and copolymers of the vinyl halides, said copolymers containing at least 50% of the vinyl halides. Examples of such polymers include poly (vinyl chloride), copolymers of vinyl chloride and vinyl acetate, copolymers of vinyl chloride and vinylidene chloride, copolymers of vinyl chloride and ethyl maleate, copolymers of vinyl chloride and 2-chloropropene, copolymers of vinyl chloride and methyl methacrylate and the like. Especially preferred are the homopolymer of vinyl chloride and copolymers of vinyl chloride and members of the group of vinylidene chloride and ethylenically unsaturated esters of carboxylic acids.

The amount of liquid contained in the coagulate will vary over a considerable range depending upon the method of preparing the polymer, method of coagulation, and the like. In most cases, the amount of liquid present in the coagulate will vary from about 30% to 65% by weight of polymer. Coagulates containing higher or lower amounts, however, may be utilized in the process if necessary.

The wet polymer coagulates used in the process may be prepared by any suitable method, but are preferably prepared by polymerizing the unsaturated monomer in an aqueous emulsion process and then coagulating the resulting latex.

Any of the known aqueous emulsion polymerization processes such as, for example, those wherein the monomer is added to an aqueous emulsion containing water, an emulsifying agent and polymerization catalyst and the mixture heated to a polymerizing temperature, may be used to prepare the polymer, but the advantages of the invention are more apparent when the polymer is prepared by a continuous aqueous emulsion process, i. e. wherein the components are continuously added and a portion of the reaction mixture continuously withdrawn, and the reaction mixture is stirred either by mechanical stirrer or by the action of a stream of monomer passing through the water phase such as in the process disclosed and claimed in U. S. Patent No. 2,618,626.

Emulsifying agents that are generally employed in the preferred aqueous emulsion polymerization process include the soaps, such as sodium and potassium myristate, laurate, palmitate and stearate; the alkali metal alkyl or alkylene sulfates, such as sodium luryl sulfate; the alkali metal alkyl, alkylene or alkaryl sulfonates, for example, sodium lauryl sulfonate; sulfonated mineral oil, and the like. The amount of the emulsifying agent utilized will vary over a wide range depending on the various conditions but in most cases will vary from about 0.1% to 6% by weight of monomer.

Examples of polymerization catalysts used in the polymerization process comprise the per-acids, such as persulfuric acid, peracetic acid, and perphthalic acid, the per-salts, such as potassium persulfate, the peroxides, such as hydrogen peroxide, benzoyl peroxide, and the like. The amount of the catalyst employed will usually vary between about 0.01% to 5% by weight of monomer.

Temperatures employed in the polymerization will depend upon the monomer and the particular catalyst selected, but in most cases will vary from about 30° C. to about 90° C., with a preferred range varying from about 40° C. to 80° C. Atmospheric, superatmospheric or subatmospheric pressure may be used as desired or necessary.

The polymer latex formed in the aqueous emulsion may be coagulated by any suitable means, such as by the addition of salts, as sodium chloride, acids, such as nitric acid, solvents, such as isoamyl alcohol and mixtures of isoamyl alcohol and methyl ethyl ketone, mixtures of salts and solvents and freezing. The more preferred method of coagulation comprises adding an electrolyte, such as sodium chloride or an acid as nitric acid.

After coagulation, the polymer particles may be removed from the reaction mixture by any convenient method, such as by centrifugation, filtration, dehydration, and the like.

To illustrate the manner in which the invention may be carried out, the following examples are given. It is to be understood, however, that the examples are for the purpose of illustration and the invention is not to be regarded as being limited to any of the specific conditions cited therein.

*Example I*

Polyvinyl chloride was prepared in a continuous process in a reactor provided with a stirrer. The emulsifier was sodium laurate present in a 0.8% concentration. The catalyst was potassium persulfate in a 0.04% concentration. The temperature was 48° C., the conversion 80%. The polymer was coagulated by adding nitric acid to a pH value of 2. Thereafter sodium hydroxide was added so as to neutralize the mixture and to convert free lauric acid into its sodium salt. The coagulate was separated from the water phase by centrifuging. The product thus obtained had a bulk density of 0.36 g./cu. cm. and contained 35% water. The particle size distribution was as follows:

90% > 0.025 mm.
80% > 0.04 mm.
1% > 0.3 mm.

The wet polymer coagulate was heated to 60° C. and then placed in a screw-press known as the "KP" oil-expeller of Harburger Eisen- und Bronzewerke A. G. The press was driven by a 15 H. P. engine. The screw had a speed of 9½ R. P. M., with which a pressure of approximately 400 atmospheres absolute was reached. The substance leaving the press was in the form of peelings approximately 5 mm. thick and with an area of approximately 20 sq. cm. The moisture content now amounted to 1.6%.

Slots were provided in the wall of the housing between the press bars for draining off the water, these slots being 0.8 mm. wide at the commencement and 0.25 mm. at the end (wherein the polymer left the press). It was noticeable that a clear liquid ran out through these slots, while the particle size of the polymer was considerably smaller than the width of the slots.

The peel-like fragments were ground in a disintegrator known as "Contraplex Weitkammer Mühle–400 CW" made by Messrs. Alpine, A. G., Augsburg. In this disintegrator, two systems of rods rotate in opposite directions at 8,600 and 3,500 R. P. M. respectively. Air-sifting was applied by means of a "Mikroplex Spiral Windsichter 132 NP," also made by the aforementioned firm. The product was reduced to a particle size of less than 0.025 mm. The moisture content was now found to have dropped to 0.08%. The bulk weight was now 0.63.

The product thus obtained was mixed on a roller with dioctyl phthalate and cadmium stearate in the ratio of 100 parts of polyvinyl chloride, 40 parts of dioctyl phthalate and 1 part of cadmium stearate. After rolling for only 5 minutes, the mixture was completely homogeneous and after gelatinization showed no "fish-eyes." When the moist coagulate was dried in a warm current of air such homogeneity was only reached after rolling had been contined for 20 minutes. The plasticized sheet also showed improved thermostability and improved electrical properties over a related plasticized sheet obtained from particles dried in a warm current of air.

*Example II*

A copolymer of 80 parts vinyl chloride and 20 parts vinylidene chloride is prepared in a continuous process in a reactor provided with a stirrer under conditions shown in Example I. The wet coagulate containing about 40% water is heated to 50° C. and then placed in the "KP" oil-expeller described in the preceding example. The press is driven so that the screw has a speed of 9½ R. P. M., by which a pressure of approximately 400 atmospheres absolute is reached. The water is drained off by means of the slot in the wall of the housing as shown in the preceding example. The resulting polymer peeling obtained from the screw press is then ground in the "Contraplex Weitkammer Mühle–400 CW" disintegrator previously described. The product is reduced to a particle size of less than 0.025 mm. and the moisture content had been reduced below .1%.

The product thus obtained is mixed on a roller with dioctyl phthalate and cadmium stearate in the ratio of 100 parts of polyvinyl chloride, 40 parts of dioctyl phthalate and 1 part of cadmium stearate. After rolling for about 5 minutes, the mixture is completely homogeneous and after gelatinization showed no "fish-eyes."

*Example III*

Plasticized sheets having similar properties are obtained by replacing the wet coagulate of the vinyl chloride-vinylidene chloride copolymer in the preceding example with wet coagulates of a copolymer of vinyl chloride and vinyl acetate, vinyl chloride and ethyl maleate and a vinylidene chloride-vinyl acetate copolymer.

I claim as my invention:

1. A process for treating wet coagulates of non-rubbery polymers of ethylenically unsaturated compounds of the group consisting of vinyl halides and vinylidene halides, which coagulates contain at least 30% water, which comprises pressing the particles of the wet coagulate, which have been initially heated to a temperature between 30° C. and 80° C., together under a pressure of 150 to 80 atmospheres in an enclosed zone until the water content has been reduced to less than 5%, simultaneously withdrawing the expelled water, and grinding the compressed particles.

2. A process for treating a coagulate of vinyl chloride polymer containing at least 30% water and being obtained by emulsion polymerization of the monomer and subsequent coagulation, which comprises pressing the particles of the wet coagulate, which have been initially heated to a temperature of 30° C. to 80° C. together in an enclosed zone wherein the discharge pressure is between 150 to 800 atmospheres until the water content has been reduced to no more than 2%, simultaneously withdrawing the expelled water, and grinding the compressed particles to form particles having a size between 0.02 mm. to 0.5 mm.

References Cited in the file of this patent
FOREIGN PATENTS 661,881      Great Britain _____ Nov. 28, 1951

OTHER REFERENCES

Smith: "Polyvinyl Chloride Production at Burghausen and Ludwigshafen," pages 4 and 5 (July 1946), Fiat Final Report 862, OMGG (U. S.).